United States Patent [19]

Acharya et al.

[11] Patent Number: 6,094,508
[45] Date of Patent: Jul. 25, 2000

[54] PERCEPTUAL THRESHOLDING FOR GRADIENT-BASED LOCAL EDGE DETECTION

[75] Inventors: Tinku Acharya, Tempe; Ping-Sing Tsai, Chandler, both of Ariz.

[73] Assignee: Intel Corporation, Santa Clara, Calif.

[21] Appl. No.: 08/986,461

[22] Filed: Dec. 8, 1997

[51] Int. Cl.$^7$ .................................................. G06K 9/48
[52] U.S. Cl. .......................................... 382/199; 382/272
[58] Field of Search .................................. 382/199, 201, 382/205, 256, 260, 261, 262, 263, 264, 265, 266, 270, 272, 274, 203

[56] References Cited

U.S. PATENT DOCUMENTS

| | | | |
|---|---|---|---|
| 5,014,124 | 5/1991 | Fujisawa | 358/75 |
| 5,111,516 | 5/1992 | Nakano et al. | 382/203 |
| 5,231,580 | 7/1993 | Cheung et al. | 382/128 |
| 5,457,754 | 10/1995 | Han et al. | 382/128 |
| 5,566,246 | 10/1996 | Rao | 382/154 |
| 5,572,565 | 11/1996 | Abdel-Mottaleb | 382/132 |
| 5,734,739 | 3/1998 | Sheehan et al. | 382/199 |
| 5,778,107 | 7/1998 | Katoaka | 382/205 |
| 5,809,169 | 9/1998 | Rezzouk et al. | 382/199 |
| 5,845,007 | 12/1998 | Ohashi et al. | 382/199 |

OTHER PUBLICATIONS

"The Canny Edge Detector," Advanced Edge-Detection Techniques, pp. 24–29, 1986.

*Primary Examiner*—Matthew Bella
*Attorney, Agent, or Firm*—Blakely, Sokoloff, Taylor & Zafman LLP

[57] ABSTRACT

What is disclosed is a method for dynamically and automatically determining the threshold value for edge detection based on localized intensity information. Each pixel can be assigned a threshold to which its gradient or other intensity change information can be compared so as to detect whether or not the pixel belongs to an edge feature of the image or not. Further, the thresholding can be based upon the response of the human vision system so that visual appearance of the image to users is considered when analyzing localized intensity information. The localized thresholding technique can be applied to any edge detection scheme.

22 Claims, 6 Drawing Sheets

PERCEPTUAL THRESHOLDING FOR GRADIENT-BASED LOCAL EDGE DETECTION

BACKGROUND OF THE INVENTION

1. Field of the Invention

The invention relates generally to the field of image processing. More specifically, the invention relates to the detecting of features within images.

2. Description of the Related Art

In the art of image processing, images of an object/scene can be characterized by certain features. One important such image feature an image "edge" feature. An edge of an image may be defined by the abruptness in intensity and/or color change between a first region of pixels and second region of pixels. Along the boundary between the two regions, a group of pixels on either side may be classified as "edge" pixels or pixels belonging to an edge feature. For instance, as an extreme example of an edge feature, consider three rows of pixel having a color of pure blue and two rows of white color pixels consecutively following the three blue rows. The pixels of the 3rd and 4th rows, of blue and white color, respectively, may each be thought of as an edge. Since there is an abrupt and large differential in color and intensity between the 3rd and 4th row, these pixels are on the "edge" and collectively represent an edge feature. By contrast a row of pixels of color white and a subsequent adjacent row of pixels of an off-white color would less likely be considered as an edge feature since the intensity change would not be large and abrupt enough to be classified as an edge. The field of art known as edge detection presents techniques for detecting and discriminating edges and provides various forms of data and statistics regarding the edge information in an image useful in image processing applications.

The classification of image into edge features has many important applications in image processing and rendering. One important application is the sharpening of image by removing blurriness and enhancing edges. Another application is shape or pattern recognition which may be used in computer vision or OCR (Optical Character Recognition). Such applications are heavily dependent upon the success of the edge detection process. If edges cannot be detected they cannot be enhanced, and if a non-edge to edge boundary is not properly identified, a blur will remain a blur. Edge detection may fail in one of two ways: "false" edges may be created, i.e., features that are not edges are classified as edges, or edges may be destroyed, i.e., features that are edges are classified as non-edge features and then so processed to decimate the edge.

The edge detection problem has been approached from many different angles. One approach is to consider an edge as a change in the intensity level from one pixel or region to another. An operator (mathematical function(s)) applied upon a set of data), such as a gradient operator, which is capable of measuring this change can thus be utilized in edge detection. In addition to computing the change(s) in intensity level using some form of operator, the edge detector must also be possessed of a threshold value that indicates whether a given intensity value change can be classified as representing an edge or non-edge region or pixel. A comparison between the threshold and measured intensity change decides whether a pixel belongs to an edge or not. Most threshold-based edge detectors try to fix a predefined threshold that is applicable over an entire image and further, applied to every image generated by a particular imaging device or process. This is problematic because within an image certain features such as a shadow can wreak havoc with the edge detection process. For instance, if part of an image is in the shadow of a light source while the other regions of the image are in the brighter area of the light source, the intensity variations in the shadow area will not compare well to detect the edges as may the edges in the brighter area. The shadow region will show less change in intensity, since the intensity values are in a lower and more narrow range than the brighter area of the image for an identical edge feature. As a result, if a high threshold value is set, the edge features present in the shadow region of the image will be mis-classified as non-edge features.

To correct the problem, it may thus be necessary to set a lower threshold. But often, the setting a low threshold will lead to the opposite problem of introducing false edges. While a low threshold may work for one image or type of image, it may produce poor edge detection results for another type of image by introducing false edges. Thus, from image to image, the threshold value has often been set by a manual process, where a user selects a threshold for a particular image. The selecting of a threshold is often achieved through trial and error—a threshold is tested against every image and the results analyzed later. Further, most edge detectors ignore the localized intensity range problem because the threshold is applied everywhere throughout the image. One the most well-known and effective edge detectors that have developed, the Canny edge detector, uses hysteresis thresholding. In hysteresis thresholding, a high threshold and low threshold are set, and in a first pass all pixels with intensity value change (gradients) greater than the high threshold are deemed to be edge pixels. In the next pass, any pixels adjacent to or closely neighboring edge pixels that are greater than the low threshold are also classified as edge-pixels. Even with the Canny edge detector, the high and low threshold values constituting the hysteresis are currently both selected manually.

Thus it would be desirable to provide an improved edge detector that automatically selects the threshold value from image to image without user intervention. Further, as discussed earlier, it would be desirable to account for potential local intensity characteristics within an image so that the threshold value can be tuned locally within regions of the same image. Further, as edge detection is typically implemented in software due the cost of computation, it would be desirable to devise a technique that is suitable for fast hardware implementation so that a digital camera or robotic eye can have automatic hardware based edge detection capability.

SUMMARY OF THE INVENTION

A method is disclosed which defines a localization region of an image, the localization region a selected portion of the image and then determines automatically, without user intervention, the threshold to be applied for edge detection within the localization region. The threshold is based on intensity information of pixels within the localization region.

BRIEF DESCRITPION OF THE DRAWINGS

The objects, features and advantages of the method and apparatus for the present invention will be apparent from the following description in which.

DETAILED DESCRIPTION OF THE INVENTION

Referring to the figures, exemplary embodiments of the invention will now be described. The exemplary embodiments are provided to illustrate aspects of the invention and should not be construed as limiting the scope of the invention. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

When an image captured by a sensor or camera or other imaging device or otherwise obtained is analyzed, it can be said to have features that are edge features while all other features are said to be non-edge features. The determination of what constitutes an edge is difficult and not an exacting process. Edge detection is often based measuring a change in intensity and then comparing the change in intensity to a threshold. The selection of this threshold is a fundamental problem in edge detection, since too low a threshold will generate false edges and too high a threshold skip edges. Since no single threshold is appropriate for every image, it must be tuned from image to image. Often, this is done manually by a user. If not, the threshold value is preset which is not desirable since certain images may not respond well to a particular threshold for the purpose of detecting edges. Further, even if a threshold is somehow determined on an image by image basis in traditional edge detecting, the threshold is applied throughout the image uniformly. In images with differing light sources which can change the field or range of intensity within one region of an image different from that of other regions, a uniform threshold is inadequate and will lead to inaccurate edge detection results.

Accurate edge detection is important in pattern recognition, computer vision, image enhancement and many other fields of image processing. It would desirable to avoid the need for user intervention in setting a threshold, and further to determine a threshold based on the intensity characteristics of an image. Preferably, the techniques should be applied to local area so that edges of low intensity variation are still detected accurately. Also, the technique(s) used should be capable of fast hardware implementation such that it can be implemented, if desired, in a digital camera or imaging device where the image pattern is generated. One such possible edge detection methodology is shown in FIG. 1 and in various other embodiments discussed below.

Figure 1:
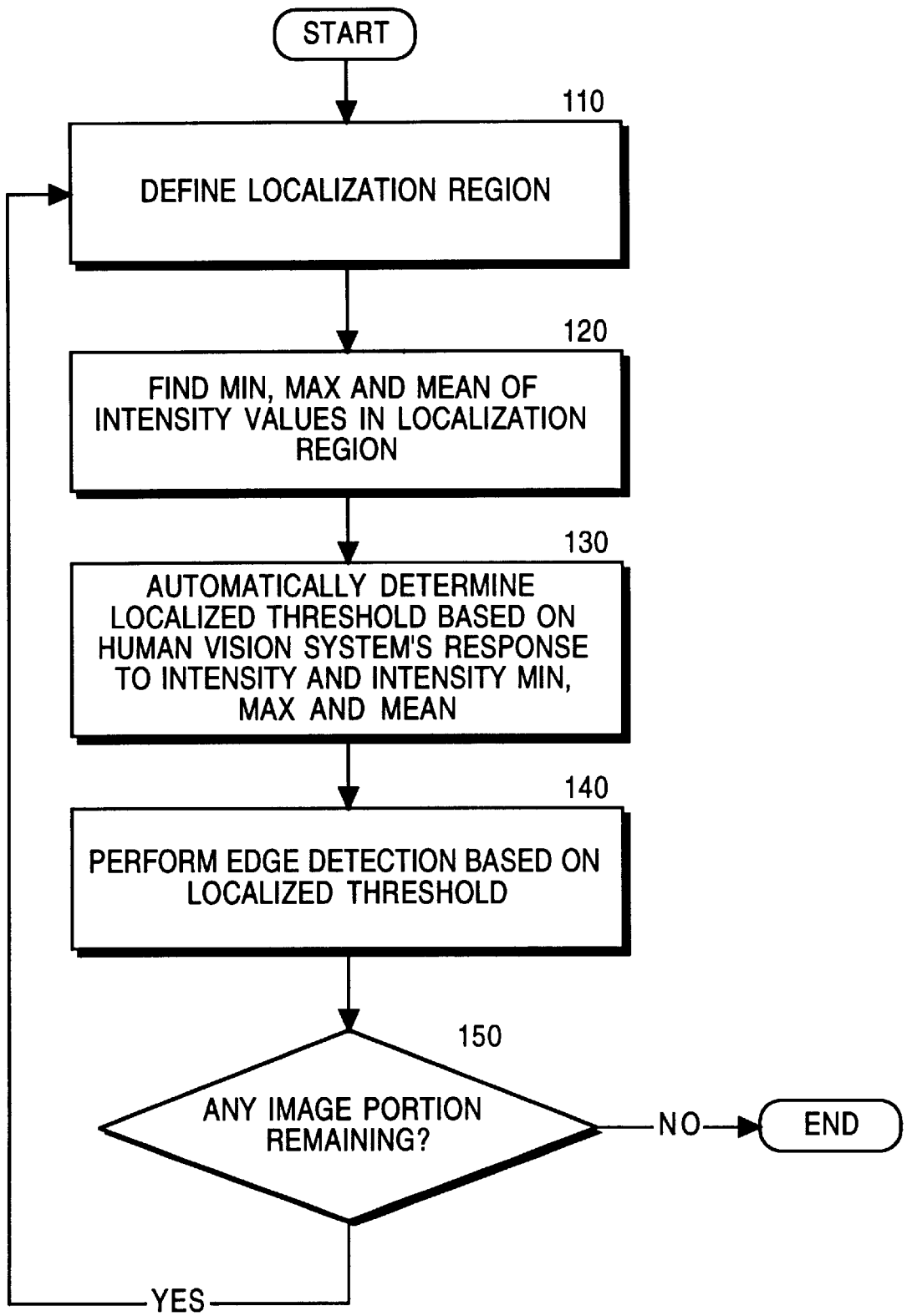
FIG. 1 is a flow diagram on one embodiment of the invention.

FIG. 1 is a flow diagram on one embodiment of the invention.

First, a localization region within the image is defined (step 110). The localization region will be a M by N rectangular region of the image where M and N may be equal if desired thereby defining a square region. The localization region as a percentage of the total captured image size may be large or small depending upon the desired implementation and available hardware/software resources and speed constraints for how fast the image is desired to be processed. For instance, to utilize hardware and software in most computer systems, it may be useful to have an 8 by 8 or 16 by 16 localization region. The localization region is usually defined about a particular pixel in the image. Where the image is more uniform in characteristics over a larger region, the localization region may be defined large. However, if fine detail discrimination is crucial or the image shows wide variations in characteristics within small regions, the localization region can be defined smaller.

Once the localization region is defined, the next step is to determine three values: the mean, minimum (min) and maximum (max) of all the intensity values within the localization region (step 120). Considering a square M by M neighborhood for the localization region, this involves $M*M-1$ comparisons. The min, max and mean of the intensity values within a localization region allows for finer discrimination within an image in selecting the threshold. The intensity characteristics of a localization region in the image will allow the edge detection application to determine what meaning to assign to a given change in intensity for a pixel(s) within that region. By contrast, the typical edge detection takes no account of localized intensity variation.

Once the gradient information is determined, a threshold should be determined (step 130). The threshold is compared to a change in intensity (usually measured as a gradient) and if the change in intensity is above the threshold, the pixel or region can be classified as an edge. In the traditional edge detector, the threshold value is already pre-set and not varied from image to image. If image to image threshold variation is desired, it must often be varied manually by a user. Additionally, the traditional threshold based edge detectors do not attempt to dynamically adjust the threshold value in a local region of a given image, but rather apply the same threshold, whether tuned to the specific image or not, throughout a given image.

Figure 2:
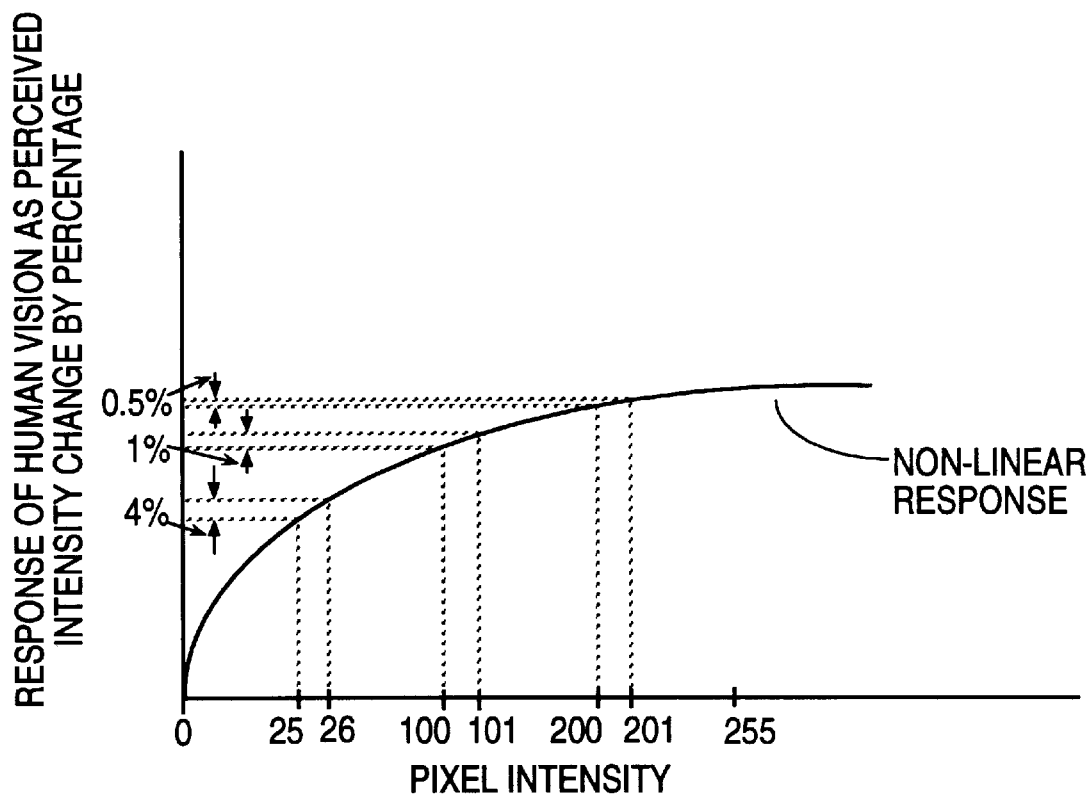
FIG. 2 is an approximation of the human vision system's response to changes in intensity.

By contrast, according to step 130, the threshold value for edge detection according to one embodiment of the invention is determined automatically. This determination is based upon the human vision system's response (optics of the human eye and mental perception by the human brain) to changes in intensity. FIG. 2, described below, graphically illustrates an approximate human vision system response curve as against changes in intensity. In general, the higher the range of intensity values, the less capable the human vision system is of discerning the changes in intensity. The threshold, if adjusted to the human vision system's response, will be much more accurate and in image edge enhancement, the visual quality of such an enhanced image to a human being will appear better than the same image if enhanced without "perceptual" thresholding.

The perceptual thresholding according to step 130 also involves the use of the localization region's intensity characteristics, namely the min, mean and max determined at step 120. One way to express the relative range of intensities and relative intensity values within the localization region is to define a percentage or quotient which compares the total spread of intensity values within the localization region to the difference of the mean and min. Thus, a "relative localization intensity" (RI) for thresholding may be defined as $$RI = (mean - min)/(max - min).$$

The RI can be used for thresholding, but the RI factor is not optimal in the sense that it does not correlate to the human vision system or application for edge detection is being employed. As shown in FIG. 2, and as is well-known in the field of optics and imaging, the human vision system's response to intensity variation follows a roughly logarithmic pattern. Thus, to account for the perceptual ability of the human vision system, a power function operator should also be a factor in determining the threshold. Hence, the threshold for edge detection, is preferably $RI^a$, where "a" is a power factor. Simulation and test results have shown that a power factor of 0.45 closely approximates the human vision system. Thus, the threshold, "T", to be employed in edge detection for human vision purposes is:

$$T=\{(mean-min)/(max-min)\}^{0.45}.$$

This power function operator is merely exemplary and may be modified according to new information gained in the field about the human vision system or depending upon the application for which edge detection is being employed. For instance, in pattern recognition such as OCR it may be useful to deviate from the human vision system response and reformulate the power function with a different power factor, or change the operator type to, for instance, a linear operator.

A key aspect of this embodiment of the invention is that the threshold is automatically determined and locally dynamically varied without user intervention. The thresholding may be based additionally on the perception of the human vision system, but may be modified as desired for other vision systems or applications that will utilize the edge detection that is performed.

Figure 3:
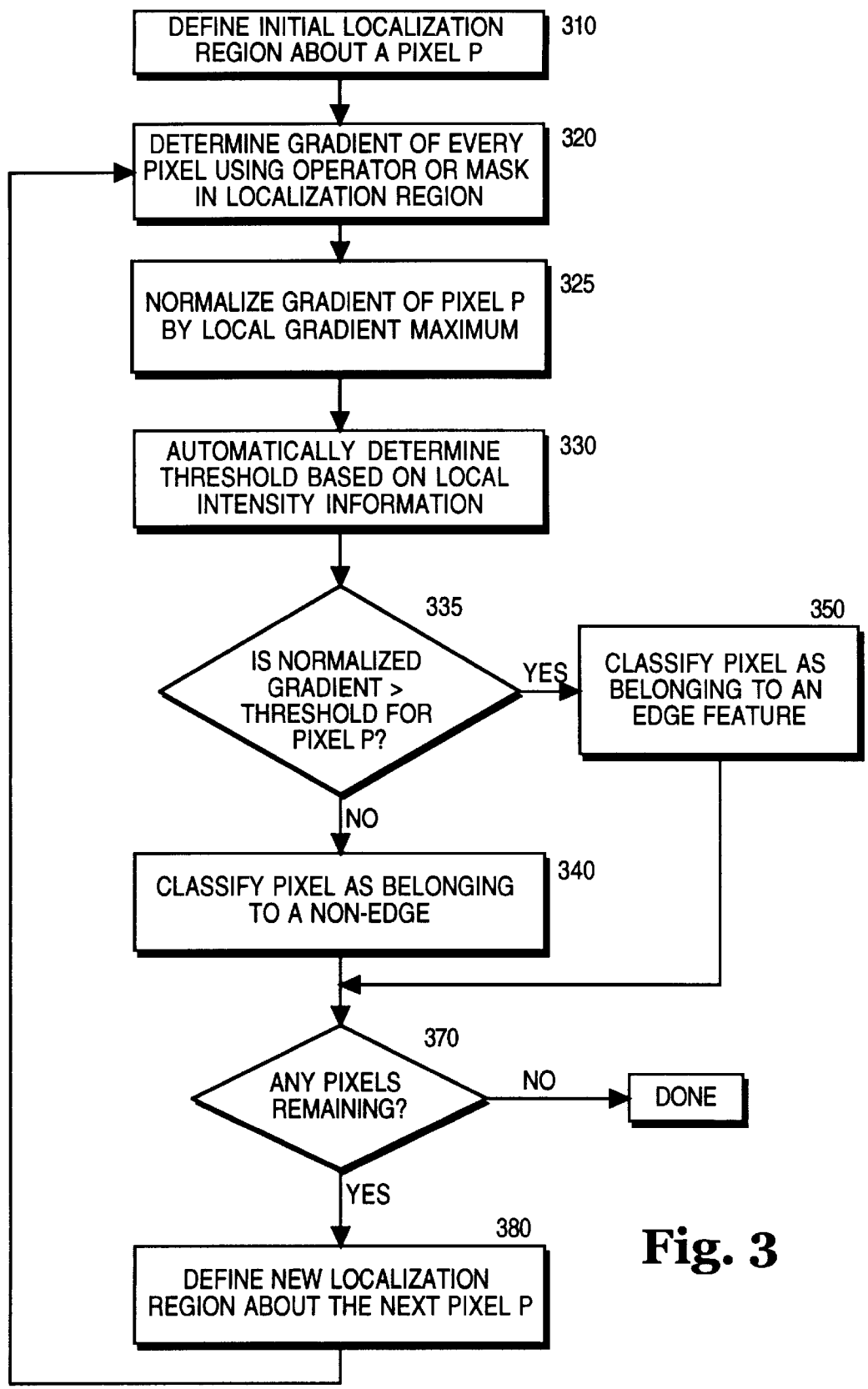
FIG. 3 illustrates gradient-based edge detection according to one embodiment of the invention.

Once a threshold is determined, then edge detection may be performed utilizing the localized threshold value (step 140). FIG. 3 illustrates a gradient-based edge detector that takes advantage of the perceptual and locally tuned thresholding. The edge detection may be performed pixel by pixel or portion by portion as desired. In other words, all pixels in the localization region may be subjected to the same dynamically obtained threshold, or just the center pixel about which the localization region is defined. Accordingly, step 150 checks to see if any image portions are remaining for edge detection. An image portion may be defined to be as small as a single pixel so that the threshold that is dynamically arrived at is re-determined for each and every pixel, and the localization region is shifted (and thus, new) for each and every pixel. If there are any image portions remaining, then the localization region is redefined (step 110) and steps 120–150 will repeat. If there no portions of image remaining to be edge-detected, the procedure is complete.

FIG. 2 is an approximation of the human vision system's response to changes in intensity.

The graph of FIG. 2 has a horizontal axis that marks possible intensity values for a pixel. Given an 8-bit-per pixel resolution image, the possible range of intensity values is between 0 and 255. The vertical axis represents the perceived change in intensity of the human vision system which shows a greatly non-linear response apparently logarithmic in nature. Essentially, the larger the intensity value whose change is being measured, the less capable is the human vision system in distinguishing the difference. For instance, a change in intensity from a value of 25 to 26 is perceived as a 4% change in intensity by the human vision system. By contrast, the same change of one intensity value from 100 to 101 shows a perceptive difference of the human vision system of only 1%. The perceptive ability diminishes further so that a change of values from 200 to 201 is only perceived as a change in intensity of 0.5%. The luminance value of a change from 201 to 200 is not as great as one from 25 to 26.

Consider thus a portion of an image where, due to a shadow, all the values are on the lower end, say between 0 and 50, while the rest of the image shows values in the higher ranges. If a uniform threshold were applied to the image, say with a T=0.6, which is often used in the art, then no edge features would be detectable within the image portion since the change would never be greater than 60% of the maximum which may be quite high. All of the edge features in that image portion would be mischaracterized. By contrast, a localized perceptual thresholding would set the threshold locally according to the maximum, minimum and mean intensity within the image portion or part of the image portion defined to be the localization region. If the maximum is 50 and the min 0, and the mean 20, then the threshold applied would be 20/50 or $0.40^{0.45}$. Further, as shown and described below, if the change in intensity or gradient is also normalized or tuned to the local region, the comparison for edge detection will be more meaningful.

The curve of FIG. 2 is well-known in the art, those skilled in the art have variously used values between 0.4 and 0.5 to represent the power function which describes the curve. Preferably, one embodiment of the invention uses a value of 0.45 for the power factor for the power function operator, but any power factor, or any other operator suitable for the application or implementation may be chosen to be applied upon the RI factor.

FIG. 3 is a flow diagram of gradient-based edge detection according to one embodiment of the invention.

First, an initial localization region within the image is defined about a pixel P (step 310). The initial localization region may be a M by N rectangular region of the image where M and N may be equal if desired thereby defining a square region. Where the image is more uniform in characteristics over a larger region, the localization region may be defined large. However, if fine detail discrimination is crucial or the image shows wide variations in characteristics within small regions, the localization region can be defined smaller.

Figure 4A:
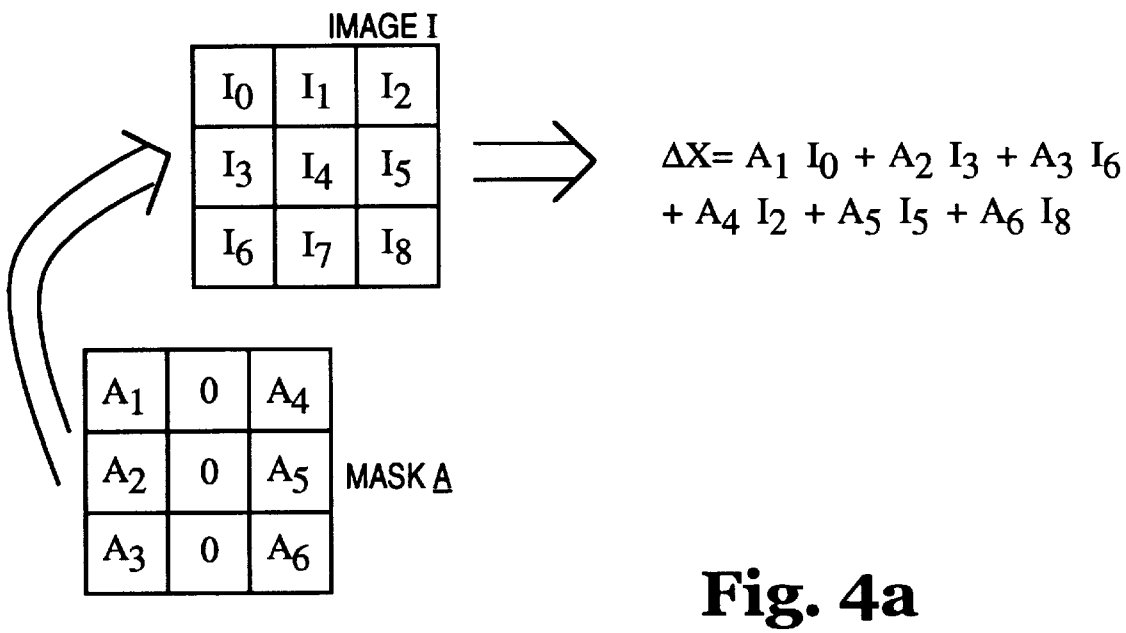
FIG. 4(a) illustrates a mask for obtaining a first direction differential for gradient determination.
Figure 4B:
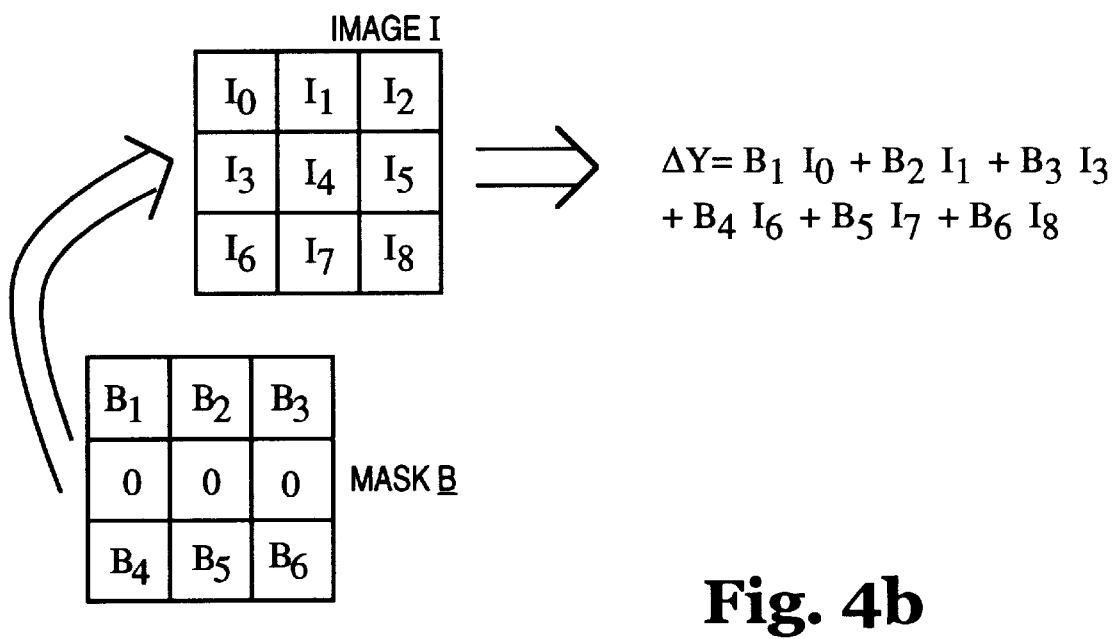
FIG. 4(b) illustrates a mask for obtaining a first direction differential for gradient determination.

Once the localization region is defined, the next step is to determine the gradient value associated with each and every pixel in the localization region by applying some mask or operator (step 320). This mask or gradient operator is applied to a small neighborhood about each pixel, ordinarily with that neighborhood as well being of smaller size than the localization region. FIGS. 4(a)–4(b) and associated description illustrate the parameters and configuration of such a mask with a 3 by 3 neighborhood about and including the pixel whose gradient is being determined. By repeatedly applying the operator or mask to each pixel in the localization region and determining the gradient thereby, gradient information for the entire localization region can be completed. The gradient measures the relative change in intensity in various directions from a given pixel in a small neighborhood (of the mask size) about that pixel.

In most gradient-based edge detection, the gradient value is normalized over the entire image by dividing the gradient by the maximum gradient in the entire image. However, such a normalization would require, if implemented in hardware, a two-pass approach where gradient information for all pixels in the entire image must be determined and then, each gradient divided by the maximum gradient value found within the image. Since a localization region is defined for the purpose of determining a local threshold, this same localization region should be utilized to normalize the gradient of a pixel P according to the maximum gradient within the localization region (step 325). This ensures that the threshold to gradient comparison will be more reflective of localized image trends. If the gradient were normalized according to the maximum gradient in the entire image, then the localized threshold would be compared against a gradient relative to the entire image and not to the localization region of concern.

Once the gradient information is determined, the threshold may be automatically determined based on local intensity information (step 330). The automatic determination of the threshold "T" is discussed in depth above with respect to step 130 of FIG. 1, but to reiterate can be expressed as $T=\{(mean-min)/(max-min)\}^a$ where "mean" is the average of all intensity values within the localization region, "min" is the minimum of all intensity values, "max" the maximum of intensity values with the region and "a" is a power factor based on the application or vision system that edge detection is applied to. If the application or vision system has a flat linear response to changes in intensity, the power factor would be "1", but most often, when characterizing the human vision system, the power factor has been shown in the art to be approximately "0.45".

To determine if the pixel P is a pixel belonging to an edge feature of the image or not, the normalized gradient is compared against the dynamically determined local threshold value (step 335). If the normalized gradient for pixel P exceeds the threshold value, the pixel P can be classified as an "edge" pixel (step 340) which is a pixel that belongs to a edge feature of the image such as a line. If not, the pixel P is classified as a non-edge pixel (step 350). While one method of edge detection, namely gradient based edge detection has been presented in the flow diagram of FIG. 3, any suitable edge detector that uses a form of thresholding may utilize the perceptual localized thresholding concept of various embodiments of the invention to improve the edge detector's capability. For instance, the well-known Canny edge detector, which uses Gaussian masks convolved with the image space in classifying edge and non-edge pixels, may be used in conjunction with the technique of localized and perceptual dynamic thresholding to set for its hysteresis, both a low threshold and high threshold based on local intensity information. For a digital imaging device such a portable still digital camera, an edge detector such as the one presented in FIGS. 3, 4(a) and 4(b) is effective due to the speed of their computation and use of less silicon area within the device.

Next, if any pixels are remaining to be treated to within the localization region (checked at step 370), steps 320–375 are repeated. If pixels do remain to classified as edge or non-edge pixels, a new localization region about the next pixel P may be defined (step 380). the localization region is different for each pixel in the image, and thus, each pixel has its own tuned localized threshold value and local gradient maximum about which it is normalized. The method of determining gradient information for a given pixel is illustrated in FIGS. 4(a) and 4(b).

FIG. 4(a) illustrates a mask for obtaining a first direction differential.

One means of determining the gradient for a pixel is to apply a mask A which essentially finds the "strength" of the pixel about a neighborhood boundary that the mask covers. This strength is essentially a differential in a particular direction along two boundaries of a pixel. This first direction, when combined with a similar computation for the strength along a second direction boundary gives a good estimation of the relative strength of the center pixel as against its neighbors. In FIG. 4(a), 3 by 3 mask is illustrated that has non-zero coefficients in its 1st and 3rd columns, and zero coefficients in the middle or 2nd column. The mask A is shown to have six non-zero coefficients A1, A2, A3, A4, A5 and A6. When the mask is applied to an Image region I having pixels with intensity values I0, I1, I2, I3, I4, I5, I6, I7 and I8, the resultant differential Ax is expressed as:
$\Delta x = A1*I0+A2*I3+A3*I6+A4*I2+A5*I5+A6*I8$. The differential Ax can be used in calculating the gradient of the pixel with intensity value I4, shown to be in the center of the image region I. Ordinarily, the mask A will have coefficients that summed together give zero. In the well-known Sobel mask, the coefficients A1, A2 and A3 all have values of −1 while the coefficients A4, A5 and A6 all have values of +1. Thus with a Sobel mask's coefficients, Δx, the differential, is $\Delta x = I2+I5+I8-I0-I3-I6$. Thus, the choice of mask coefficients, which is known in the art to achieve a meaningful gradient value, simplifies the differential computation to a mere addition and subtraction of pixel intensity values which can be implemented easily in hardware by adders. Thus, the differential becomes easy to implement and fast. A different mask, such as the Prewitt mask, if applied can be as easily implemented. The Prewitt mask has coefficients of A1 and A3 equal to −1 and an A2 coefficient of −2. To mirror, the Prewift mask has coefficients on the other directional boundary of A4 and A6 equal to +1 and a coefficient A5 of +2. Using a Prewitt mask, the Δx or differential value becomes $\Delta x = I2+2*I5+I8-I0-2*I3-I6$. Though a multiplication by 2 is introduced, this can be implemented easily by a shift operation of I5 and I3 or by splitting the computation Δx as $\Delta x = I2+I5+I5+I8-I0-I3-I3-I6$ if only add and subtract operations are implemented in the hardware.

The gradient operation is used in edge detection since it is assumed that an edge has a particular direction within the image space. The pixels along the side boundary (one side-I0, I3, I6 and another side-I2, I5, I8) of the pixel should have a strength or relative combined intensity level less than the pixel I4 itself if I4 is to be considered an edge pixel. In this regard, a first direction differential, essentially in the horizontal direction (the mask has values determining the strength on the left and right sides of the image) may be computed as given above. Since the image space is in two dimensions, vertical and horizontal, only one more direction differential about the pixel I4 need be computed.

FIG. 4(b) illustrates a mask for obtaining a second direction differential.

In FIG. 4(b), a second 3 by 3 mask is illustrated that has non-zero coefficients in its 1st and 3rd rows, and zero coefficients in the middle or 2nd row. The mask B is shown to have six non-zero coefficients B1, B2, B33, B4, B5 and B6. When the mask is applied to an Image region I having pixels with intensity values I0, I1, I2, I3, I4, I5, I6, I7 and I8, the resultant differential Δy is expressed as:
$\Delta y = B1*I0+B2*I1+B3*I2+B4*I6+B5*I7+B6*I8$. The differential Δy can be used in calculating the gradient of the pixel with intensity value I4, shown to be in the center of the image region I. Ordinarily, the mask B will have coefficients that summed together give zero. In the well-known Sobel mask, the coefficients B1, B2 and B3 all have values of −1 while the coefficients B4, B5 and B6 all have values of +1. Thus with a Sobel mask's coefficients, Δy, the differential, is $\Delta y = I6+I7+I8-I0-I1-I2$. Thus, the choice of mask coefficients, which is known in the art to achieve a meaningful gradient value, simplifies the differential computation to a mere addition and subtraction of pixel intensity values which can be implemented easily in hardware by adders. Thus, the differential becomes easy to implement and fast. A different mask, such as the Prewitt mask, if applied can be as easily implemented. The Prewitt mask has coefficients of B1 and B3 equal to −1 and an B2 coefficient of −2. To mirror, the Prewitt mask has coefficients on the other directional boundary of B4 and B6 equal to +1 and a coefficient B5 of +2. Using a Prewitt mask, the Δy or differential value in the second direction along the image boundary becomes Δy=I6+2*I7+I8−I0−2*I1−I2. Though a multiplication by 2 is introduced, this can be implemented easily by a shift operation of I5 and I3 or by splitting the computation Δx as Δy=I6+I7+I7+I8−I0−I1−I1−I2 if only add and subtract operations are implemented in the hardware. Preferably, the mask A used to find the Δx or first direction differential should be the same type of mask B that is used to find the second direction differential. It may be desirable to use a Sobel mask in one direction and Prewitt in another to compensate since the imaging device may not yield square pixels, but rather, rectangular pixels or pixels of other shape. In such a case, the geometry of a pixel may be accounted for in the choice of mask coefficients.

With the second direction differential Δy obtained as given above, both directional boundary pairs horizontal and vertical are accounted for. Then the gradient of I4, the central pixel in the image space I is the magnitude of the vector obtained by a vector which is the sum of the vectors obtained in each direction. Hence, the gradient G is simply $$\sqrt{\Delta x^2 + \Delta y^2},$$

or the magnitude of that vector formed by combining Δx and Δy. The gradient of each pixel may thus be obtained by considering a neighborhood, preferably a small 3 by 3 neighborhood that surrounds each pixel, and then by applying a mask upon it in each of two directions and their corresponding boundary pairs essentially thereby including every immediately adjacent pixel in the gradient determination. As mentioned above, the gradient value may be normalized for the maximum gradient present in the localization region so that relative weight is given to the gradient measure. For instance, in a portion of an image with more texture rather than hard edges such as lines, the gradient values may lie within a narrow region. If these are normalized, to the maximum gradient within that local region, then the gradient values obtained can be more effectively analyzed. The normalized gradient $$G = \sqrt{\Delta x^2 + \Delta y^2} \Big/ G_{LMAX}$$

where $G_{LMAX}$ is the maximum gradient of all pixels within the localization region.

Figure 5:
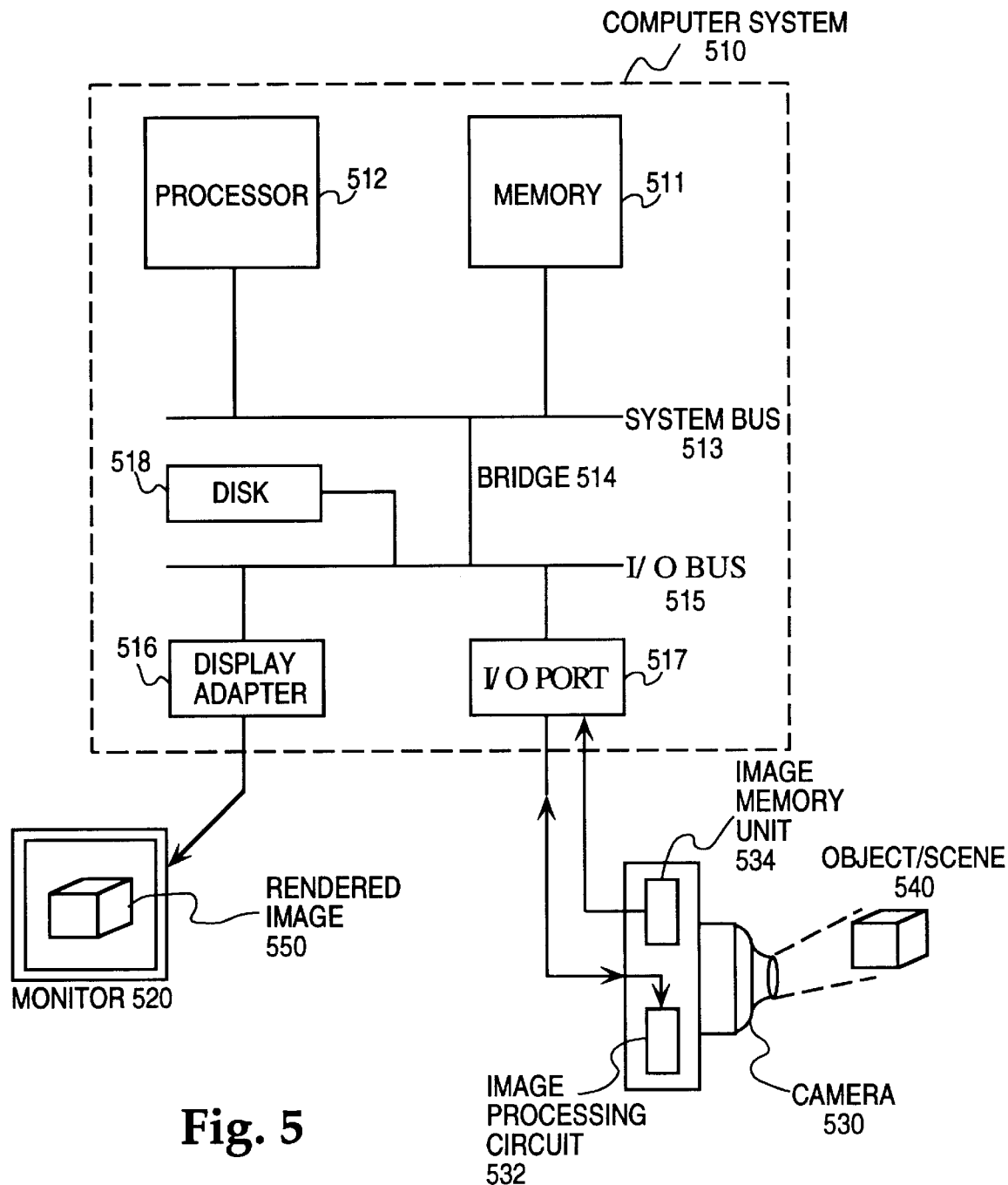
FIG. 5 is a system diagram of one embodiment of the invention.

FIG. 5 is a system diagram of one embodiment of the invention.

FIG. 5 illustrates a computer system 510, which may be any general or special purpose determining or data processing machine such as a PC (personal computer), coupled to a camera 530. Camera 530 may be a digital camera, digital video camera, or any image capture device or imaging system, and is utilized to capture a sensor image of an object or scene 540. Essentially, captured images are compressed and processed by an image processing circuit 532 so that they can be efficiently stored in an image memory unit 534, which may be a RAM or other storage device such as a fixed disk, miniature card, etc. In most digital cameras, raw images obtained from the image capture mechanism such as a sensor are stored first on camera 530 and downloaded later to be output, displayed, or manipulated. This allows the camera 530 to capture the next object quickly without additional delay. One convenient raw image representation is the 8-bit Bayer pattern CFA described above which associates a color (either Red, Green or Blue) with each pixel's gray scale intensity value.

In one embodiment, an image is captured by camera 530 as a raw 8-bit Bayer pattern CFA and then compressed into some other data or encoded format. Localized thresholding for edge detection according to one embodiment of the invention operates as follows. First, the compressed image is downloaded from camera 530 through I/O port 517 to a disk 518 or other device on the computer system 510. The compressed image is decompressed on computer system 510. Then, the computer system performs localized thresholding for edge detection on the recovered CFA image by executing instructions which configure the processor 512 for so doing as described in the various embodiments of the invention.

The methodology described in the various embodiments of the invention may be executed using a processor 512 such as the Pentium™ (a product of Intel Corporation) and a memory 511, such as RAM, which is used to store/load instruction, addresses and result data. The application used to perform perceptual thresholding and edge detection may be an executable module compiled from source written in a language such as C++. The instructions of that executable module, which correspond with instructions that aid in determining and normalizing gradient values, finding local intensity characteristics and automatically determining a localized threshold may be stored to a disk 518 or memory 511, and thus may be loaded through some computer-readable medium. It would be readily apparent to one of ordinary skill in the art of computer sciences to program a determining machine to carry out the interpolation methodology described in various embodiments of the invention.

Computer system 510 has a system bus 513 which facilitates information transfer to/from the processor 512 and memory 511 and also has a bridge 514 which couples system bus 513 to an I/O bus 515. I/O bus 515 connects various I/O devices such as a display adapter 516, disk 518 and an I/O port, such as a serial port. Many such combinations of I/O devices, buses and bridges can be utilized with the invention and the combination shown is merely illustrative of one such possible combination.

When an image, such as an image of object/scene 540, is captured, the image is sensed as R, G, and B pixel intensity values in a CFA such as the well-known Bayer pattern. These pixel intensity values are sent to the image processing circuit 532. Image processing circuit 532 consists of ICs and other components which execute among other functions, an image compression scheme to reduce the size of the transfer between camera 530 and computer system 510. The need for color interpolation is most significant when the image is to be displayed or output and thus does not have to be performed on camera 530. When the user or application desires/requests a download of images, the compressed images stored in the image memory unit are transferred from image memory unit 534 to the I/O Port 517. I/O port 517 uses the bus-bridge hierarchy shown (I/O bus 515 to bridge 514 to system bus 513) to temporarily store the image data into memory 511 or, optionally, to disk 518. The compressed images are decompressed by suitable application software (or dedicated hardware) and may utilize processor 512 for doing so. The decompressed image data will be recovered as an 8-bit per-pixel set of intensity values similar or identical to the image data as captured by the sensor of camera 530.

The downloaded image once decompressed will thus have pixels in their Bayer pattern form, that is, an 8-bit intensity value for a pixel but only associated with one of three color planes, Red, Green, or Blue. In one application, if an edge enhanced version of the image is desired to be output on monitor 520, then localized thresholding and edge detection according to the various embodiments of the invention should be employed. The downloaded and decompressed image is analyzed pixel-by-pixel and by applying the techniques discussed above, each pixel is classified as either edge or non-edge. With the edges detected, they can be enhanced or otherwise processed by another application or code module. While performing localized thresholding and edge detection, the gradient values and normalized gradient values may be stored in memory 511 or disk 518 into an array. If each element of the stored array is capable of storing a set of data as opposed to a single datum, then the normalized gradient, gradient, original pixel intensity localized threshold for that pixel may all be stored such that they can reused for other applications. If edge enhancement is the purpose of the edge detection, the rendered image 550 will be visually appear with better detail and sharper edges, given adequate display devices (monitor 520 and adapter 516), than a traditional edge detection method. The edge enhanced image may be stored onto disk 518, memory 511 and/or output directly to monitor 520 after being rendered through display adapter 516. By using the human vision system as a factor in the thresholding, as described above with respect to various embodiments of the invention, the rendered image 550 will appear a higher quality image to users. A wide array of imaging and computer vision applications, such as OCR, which may be implemented in part on computer system 500, may utilize localized thresholding and edge detection according to the various embodiments of the invention. Further, if any other edge detection scheme other than those discussed herein are preferred, the localized thresholding technique can be applied thereto with slight modifications so that scheme operates more effectively.

The computer program code for localized thresholding and edge detection may be packaged onto a removable computer-readable medium such as floppy disk or CD-ROM and may accompany software that performs the decompression of images downloaded from camera 530. As with any other software, it can be downloaded/distributed over a network on communications system, or can be available in firmware. These downloaded images can be enhanced according to their edge features so that the images will more accurately visually present the object/scene 540 to the user. Edge detection and localized thresholding according to another embodiment of the invention may also be implemented in hardware on the camera 530 itself.

In an alternative embodiment of the invention, the image processing circuit 532 can be adapted to include circuitry for performing localized thresholding and edge detection on-camera, such that the stored image in image memory unit 534 is a noise removed image. Thus, when downloaded to a computer system 510 or a rendering device, edge features will already be classified. In such an embodiment, the image's edge features may be pre-classified so that techniques such as noise removal and color interpolation are more accurately and better performed. The methods described above for finding/normalizing pixel gradients, and localized thresholds and detecting of edges are easily implemented in VLSI (Very Large Scale Integration) or other integrated circuitry.

Figure 6:
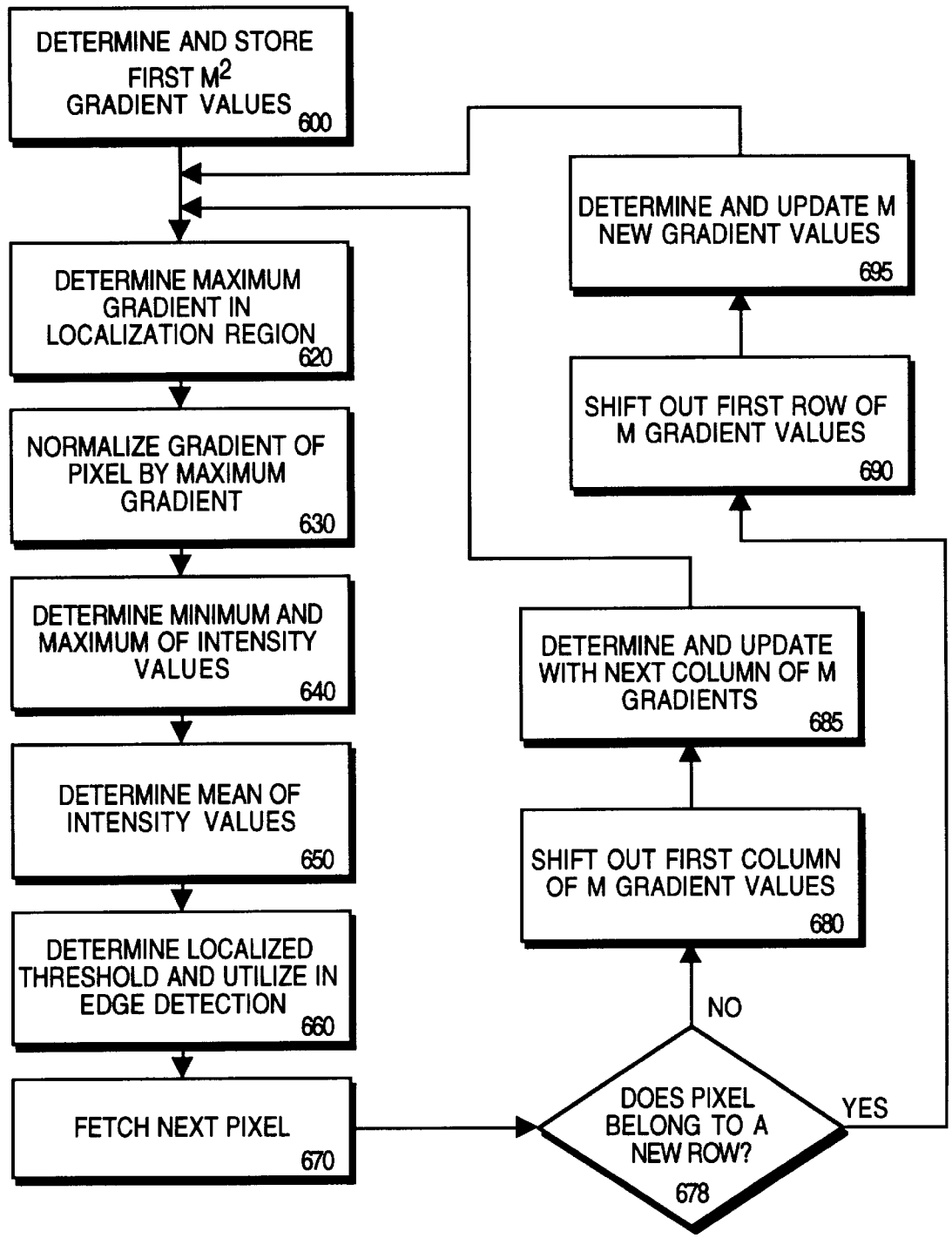
FIG. 6 is a flow diagram of modifications to the gradient based edge detection of FIG. 3 applicable to a direct hardware implementation.

FIG. 6 is a flow diagram of modifications to the gradient based edge detection of FIG. 3 applicable to a direct hardware implementation.

If implemented in hardware such as camera 530 of FIG. 5, several modifications to the method of FIG. 3 can be employed. Assuming a square M by M localization region, then initially, the very first $M^2$ pixel gradient values must be determined (step 600) and stored into a gradient array. This $M^2$ number of computations need only be performed once for a given image, as will be discussed below. Next, according to step 620, the maximum gradient in the localization region is determined. In the hardware, a comparator and register may be employed along with step 600 so that while calculating the gradient values of all $M^2$ pixels, the maximum determination is also performed. The normalization of the gradient value(s) may be performed on only the gradient of the pixel P about which the localization region is defined (step 630). Next, the min and max of intensity values is discovered (step 640). For hardware, this step may also be performed in parallel with the determination of all M2 pixel gradient values according to step 600 by a pair of registers and comparators. Next, the mean of intensity values is determined (step 650). Finally, the edge detection can be completed by determining the localized threshold and comparing it to the normalized gradient for pixel P (step 660).

When the next pixel for edge detection is fetched (step 670), then there are two possibilities. Either the pixel belongs to a new row of the image or it does not (checked at step 678). If the pixel does not belong to a new row, it is part of the same row and assuming a left to right scan of pixels, the first column of M pixel gradient values is shifted out or cleared from the gradient array (step 680). Then, only a new column of M pixel gradient values need to be calculated for the next pixel which is of the same row but one column over (step 685). If a left shift (for left to right scan) or right shift (for a right to left scan) of the columns in the gradient array is performed at step 680, only the very last column in the array needs to be updated with the newly calculated gradient values. This will speed the hardware greatly.

If the new pixel P is not of the same row, then a row change has been affected, and rather than shift out a column of the gradient array, a row of M values is shifted out (step 690). Assuming a top to bottom scan, the very first row is shifted out, all the rows are shifted up and the very last empty row in the gradient array is replaced by the newly computed M gradient values (step 695). If a row-by-row pixel scan is performed, then the direction of scan (left-to-right and right-to-left) should alternate with every new row. In this manner, the least number of gradient computations are performed. An $M^2$ number of gradient operations is performed only once if a zig-zag pattern of scanning and processing pixels is adopted. A change in direction scan will also require a change in the direction of the column/row shift of the gradient array. Such an implementation is desirable where the gradient values for the entire image are not capable of being stored or where a single-pass approach is preferred due to speed constraints.

Even with a reduction in the gradient computation, the discovery of minima and maxima of intensity and gradient values must be repeated for every pixel since it is not sufficient to merely compare the M new values with those minima and maxima previously determined since the array values shifted and cleared out may contain those minima and/or maxima and thus, faulty results would be obtained.

The exemplary embodiments described herein are provided merely to illustrate the principles of the invention and should not be construed as limiting the scope of the invention. Rather, the principles of the invention may be applied to a wide range of systems to achieve the advantages described herein and to achieve other advantages or to satisfy other objectives as well.

What is claimed is:

1. A method comprising:

defining a localization region of an image, said localization region including a selected portion of said image; and determining automatically, without user intervention, a threshold applied for edge detection within said localization region based on intensity information of pixels within said localization region, said threshold determined by a power function operator reflective of perceptual characteristics as it relates to intensity of a human vision system, said power function operator is a measure of relative localization intensity raised to a power factor; wherein said relative localization intensity is a quotient of a difference between a mean and a minimum of all intensity values within said localization region and a difference between a maximum and said minimum of all intensity values within said localization region.

2. A method according to claim 1 wherein said power factor corresponds to a perceptual ability of the human vision system to changes in intensity.

3. A method according to claim 2 wherein said power factor is 0.45.

4. A method according to claim 2 wherein said first mask is a Prewitt mask having coefficients of −1, −2, +1 and +2 variously in said second direction.

5. A method according to claim 1, further comprising:

detecting edge features of said image by comparing said threshold with a normalized gradient for a pixel P about which said localization region is defined.

6. A method according to claim 5 wherein said pixel is classified as a pixel belonging to an edge feature of said image if said normalized gradient of said pixel exceeds said threshold.

7. A method according to claim 5 wherein said normalized gradient is determined by performing the:

determining said gradient of every pixel within said localization region;

determining said maximum gradient value within said localization region; and normalizing said gradient value of pixel P by dividing said gradient of pixel P by said maximum gradient value within said localization region.

8. A method according to claim 7 wherein a gradient of a given pixel is determined by:

applying a first mask to a neighborhood around each pixel whose gradient is being determined to attain a first direction differential quantity;

applying a second mask to said neighborhood around each pixel whose gradient is being determined to attain a second direction differential quantity, said second direction, wherein said second direction is perpendicular to said first direction; and determining said gradient to be said magnitude of a vector defined by vector addition of said first direction differential quantity and said second direction differential quantity.

9. A method according to claim 10 wherein said magnitude is obtained by:

squaring said first direction differential;

squaring said second direction differential;

summing said squared first and second direction differentials; and extracting said square root of said sum, said magnitude set to equal said square root.

10. A method according to claim 8 wherein said first mask is a Sobel mask having coefficients of −1 and +1 in variously said first direction.

11. A method according to claim 8 wherein said first mask is a Sobel mask having coefficients of −1 and +1 variously in said second direction.

12. A method according to claim 8 wherein said first mask is a Prewitt mask having coefficients of −1, −2, +1 and +2 variously in said first direction.

13. An article comprising a computer readable medium including instructions stored thereon that when executed by a processor, cause:

defining a localization region of an image, said localization region including a selected portion of said image; and determining automatically, without user intervention, a threshold applied for edge detection within said localization region based on intensity information of pixels within said localization region, said threshold determined by a power function operator reflective of perceptual characteristics as it relates to intensity of a human vision system, said power function operator is a measure of relative localization intensity raised to a power factor; wherein said relative localization intensity is a quotient of a difference between a mean and a minimum of all intensity values within said localization region and a difference between a maximum and said minimum of all intensity values within said localization region.

14. The article according to claim 13 wherein said power factor corresponds to the perceptual ability of the human vision system to changes in intensity.

15. The article according to claim 14 wherein said power factor is 0.45.

16. The article according to claim 13 where the computer readable medium further includes instructions that when executed by the processor cause:

detecting edge features of said image by comparing said threshold with a normalized gradient for a pixel P about which said localization region is defined.

17. The article according to claim 16 wherein said pixel is classified as a pixel belonging to an edge feature of said image if said normalized gradient of said pixel exceeds said threshold.

18. The article according to claim 16 wherein said normalized gradient is determined by determining said gradient of every pixel within said localization region;

determining said maximum gradient value within said localization region; and normalizing said gradient value of pixel P by dividing said gradient of pixel P by said maximum gradient value within said localization region.

19. The article according to claim 18, wherein a gradient of a given pixel is determined by:

applying a first mask to a neighborhood around each pixel whose gradient is being determined to attain a first direction differential quantity;

applying a second mask to said neighborhood around each pixel whose gradient is being determined to attain a second direction differential quantity, said second direction, wherein said second direction is perpendicular to said first direction; and determining said gradient to be said magnitude of a vector defined by vector addition of said first direction differential quantity and said second direction differential quantity.

20. The article according to claim 19, wherein said magnitude is obtained by squaring said first direction differential;

squaring said second direction differential;

summing said squared first and second direction differentials; and extracting said square root of said sum, said magnitude set to equal said square root.

21. The article according to claim 19, wherein said first mask is a Sobel mask having coefficients of −1 and +1 in variously said first direction.

22. The article according to claim 19, wherein said first mask is a Sobel mask having coefficients of −1 and +1 variously in said second direction.

* * * * *

UNITED STATES PATENT AND TRADEMARK OFFICE
CERTIFICATE OF CORRECTION

PATENT NO. : 6,094,508  
DATED : July 25, 2000  
INVENTOR(S) : Acharya et al.

Page 1 of 1

It is certified that error appears in the above-identified patent and that said Letters Patent is hereby corrected as shown below:

Column 2,
Line 59, delete "DESCRITPION", insert -- DESCRIPTION --.

Signed and Sealed this

Eighteenth Day of March, 2003

JAMES E. ROGAN
*Director of the United States Patent and Trademark Office*